United States Patent
Kumar et al.

(10) Patent No.: US 12,443,512 B2
(45) Date of Patent: Oct. 14, 2025

(54) SYSTEMS AND METHODS FOR DETERMINING CODE COVERAGE FOR GPU SHADER CODE

(71) Applicant: Honeywell International Inc., Charlotte, NC (US)

(72) Inventors: Prem Kumar, Bangalore (IN); Shankar Kudimi, Bangalore (IN); Venkat Goriparthi, Hyderabad (IN); Pavan Kumar Desai, Bengaluru (IN); Aralakuppe Ramegowda Yogesha, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 198 days.

(21) Appl. No.: 18/334,246

(22) Filed: Jun. 13, 2023

(65) Prior Publication Data
US 2024/0354232 A1    Oct. 24, 2024

(30) Foreign Application Priority Data
Apr. 21, 2023  (IN) .............................. 202311029082

(51) Int. Cl.
*G06F 11/3668* (2025.01)
(52) U.S. Cl.
CPC ................................ *G06F 11/3676* (2013.01)
(58) Field of Classification Search
CPC .................................................. G06F 11/3636
See application file for complete search history.

(56) References Cited

U.S. PATENT DOCUMENTS

| | | |
|---|---|---|
| 9,292,414 B2 * | 3/2016 | Kiel ................... G06F 11/3698 |
| 9,594,544 B2 | 3/2017 | Wang et al. |
| 9,875,568 B2 | 1/2018 | Lorach |
| 11,436,783 B2 | 9/2022 | Baker et al. |
| 11,455,766 B2 * | 9/2022 | Argade .................. A63F 13/77 |

(Continued)

FOREIGN PATENT DOCUMENTS

| | | | |
|---|---|---|---|
| CN | 110928610 A | * | 3/2020 |
| CN | 106997610 B | | 8/2020 |

(Continued)

OTHER PUBLICATIONS

NPL_Method, Device And Computer Storage Medium For Verifying Shader Function—CN 110928610 A (Year: 2020).*

(Continued)

*Primary Examiner* — Ziaul A Chowdhury
(74) *Attorney, Agent, or Firm* — Fogg & Powers LLC

(57) ABSTRACT

Systems and methods for determining code coverage for GPU shader code are provided herein. In one example, a method includes adding a flag for each line of shader code to be executed by a GPU. The method further includes creating at least one graphic object to be displayed on a display device for each line of shader code to be executed by the GPU. The method further includes receiving one or more hit files that include a status of one or more attributes of displayed graphic objects on the display device after execution of a requirements-based test. The method further includes generating a structural code coverage report for the shader code based on the one or more hit files and a mapping between the shader code and the displayed graphic objects.

19 Claims, 8 Drawing Sheets

(56) References Cited

U.S. PATENT DOCUMENTS

| | | |
|---|---|---|
| 2009/0144698 A1 | 6/2009 | Fanning et al. |
| 2011/0090236 A1 | 4/2011 | Calsyn et al. |
| 2011/0214108 A1 | 9/2011 | Grunberg et al. |
| 2013/0106877 A1 | 5/2013 | Williams |
| 2014/0146062 A1* | 5/2014 | Kiel ................ G06F 11/362 345/522 |
| 2014/0184616 A1* | 7/2014 | Gupta .............. G06F 11/006 345/505 |
| 2014/0362093 A1* | 12/2014 | Lorach ............ G06T 15/005 345/522 |
| 2017/0090886 A1 | 3/2017 | Munshi et al. |
| 2019/0108006 A1* | 4/2019 | Sandanagobalane ................ G06F 11/3624 |
| 2019/0362459 A1* | 11/2019 | Okubo ................ G06T 1/20 |
| 2019/0369849 A1 | 12/2019 | Gonzalez et al. |
| 2021/0217221 A1 | 7/2021 | Fine et al. |

FOREIGN PATENT DOCUMENTS

| | | | | |
|---|---|---|---|---|
| EP | 2624135 A2 * | 8/2013 | ........... | G06F 9/4881 |
| WO | 2013062956 A1 | 5/2013 | | |

OTHER PUBLICATIONS

Aleman et al. "On the MC/DC Code Coverage of Vulkan SC GPU Code" 2022 IEEE/AIAA 41st Digital Avionics Systems Conference (DASC), Sep. 18, 2022, pp. 1 through 9.

European Patent Office, "Extended European Search Report", dated Aug. 30, 2024, from U.S. Appl. No. 18/334,246, from Foreign Counterpart to U.S. Appl. No. 18/334,246, pp. 1 through 15, Published: EP.

* cited by examiner

SYSTEMS AND METHODS FOR DETERMINING CODE COVERAGE FOR GPU SHADER CODE

CROSS-REFERENCE TO RELATED APPLICATIONS

This application claims priority to Indian Provisional Application No. 202311029082, filed Apr. 21, 2023, same title herewith, the contents of which are incorporated herein by reference in their entirety.

BACKGROUND

For software implemented in airborne systems, software certification guidelines (for example, RTCA DO-178B/C) require evidence to demonstrate that the code has been covered by requirements-based testing. Typically, software is loaded to a target system, and the requirements-based testing is conducted to determine whether the software meets all of the requirements. In addition to showing that the software meets all of the requirements, structural code coverage data is also required to demonstrate that an application does not include unintended functionality, extraneous code, or dead code. The expectation when applying for DO-178C compliance is that one hundred percent of the code has been executed during the requirements-based testing. In cases where this is not possible (for example, for defensive code that cannot be executed under normal conditions), the reasons the code is untested need to be justified.

The higher the criticality of the software, the greater the requirements for the structural code coverage data. The criticality of the software often corresponds to a safety level, which corresponds to a Design Assurance Level (DAL) for airborne systems. For DAL C, the structural code coverage data provided must show statement coverage, which requires that every statement in the code has been invoked at least once during the requirements-based testing. For DAL B, the structural code coverage data provided must show decision coverage, which requires that every point of entry and exit in the program has been invoked at least once, every control statement (branchpoint) in the program has taken all possible outcomes (branches) at least once, and every non-constant Boolean expression in the program has evaluated to both a true and false result. For DAL A, the structure coverage data provided must show Modified Condition/Decision Coverage (MC/DC), which requires decision coverage and also that every non-constant condition in a Boolean expression in the program has evaluated to both a true and false result, and every non-constant condition in a Boolean expression in the program has been shown to independently affect that expression's outcome.

Typical automatic structural code coverage tools are used to produce structural code coverage data for source code executed on a Central Processing Unit (CPU). The structural code coverage data produced has to be sent back to the test computer, which usually involves coverage hit points being streamed back to the test computer.

An automatic structural code coverage analysis tool is generally used to generate the structural code coverage data during the requirements-based testing. The structural code coverage analysis tool instruments the source code by adding probes to the source code, which are lines of instructions (hit points) to track the lines of code that are executed. The structural code coverage tool code is added to the source code and a final executable is output, and the requirements-based testing is executed on the target system. As the requirements-based testing is running, the coverage points are generated that are used for the structural code coverage data.

Structural code coverage can be collected from system tests, integration tests, and lower-level (component) tests, so long as each type of testing represents requirements-based tests. Higher-level testing (such as system testing) generally produces more structural code coverage per test than lower-level testing (such as component testing) does. As such, it is common practice to generate as much coverage as possible through higher-level tests before running lower-level tests to cover sections of the code that haven't already been covered.

SUMMARY

In some aspects, a method includes adding a flag for each line of shader code to be executed by a graphics processing unit (GPU). The method further includes creating at least one graphic object to be displayed on a display device for each line of shader code to be executed by the GPU. The method further includes receiving one or more hit files that include a status of one or more attributes of displayed graphic objects on the display device after execution of a requirements-based test. The method further includes generating a structural code coverage report for the shader code based on the one or more hit files and a mapping between the shader code and the displayed graphic objects.

In some aspects, a system includes one or more processors and a non-transitory, computer readable medium communicatively coupled to the one or more processors. The non-transitory, computer readable medium stores one or more instructions which, when executed by the one or more processors, cause one or more processors to: add a flag for each line of shader code to be executed by a graphics processing unit (GPU); create at least one graphic object to be displayed on a display device for each line of shader code to be executed by the GPU; receive one or more hit files that include a status of one or more attributes of displayed graphic objects on the display device after execution of a requirements-based test; and generate a structural code coverage report for the shader code based the one or more hit files and a mapping between the shader code and the displayed graphic objects.

In some aspects, a method includes receiving instrumented shader code to be executed by a graphics processing unit (GPU) and scripts of a requirements-based test. The instrumented shader code includes one or more flags for each line of the instrumented shader code. The method further includes executing the scripts of the requirements-based test. The method further includes displaying a respective graphic object for each line of the instrumented shader code on a display device. The method further includes changing an attribute of a respective displayed graphic object for each respective line of the instrumented shader code in response to the respective line of the instrumented shader code being executed during the execution of the scripts of the requirements-based test. The method further includes outputting one or more hit files in response to completion of the execution of the scripts of the requirements-based test, wherein the one or more hit files include a status of the attribute of each respective displayed graphic object for each respective line of the instrumented shader code.

BRIEF DESCRIPTION OF THE DRAWINGS

Understanding that the drawings depict only some embodiments and are not therefore to be considered limiting in scope, the exemplary embodiments will be described with additional specificity and detail using the accompanying drawings, in which.

Figure 1:
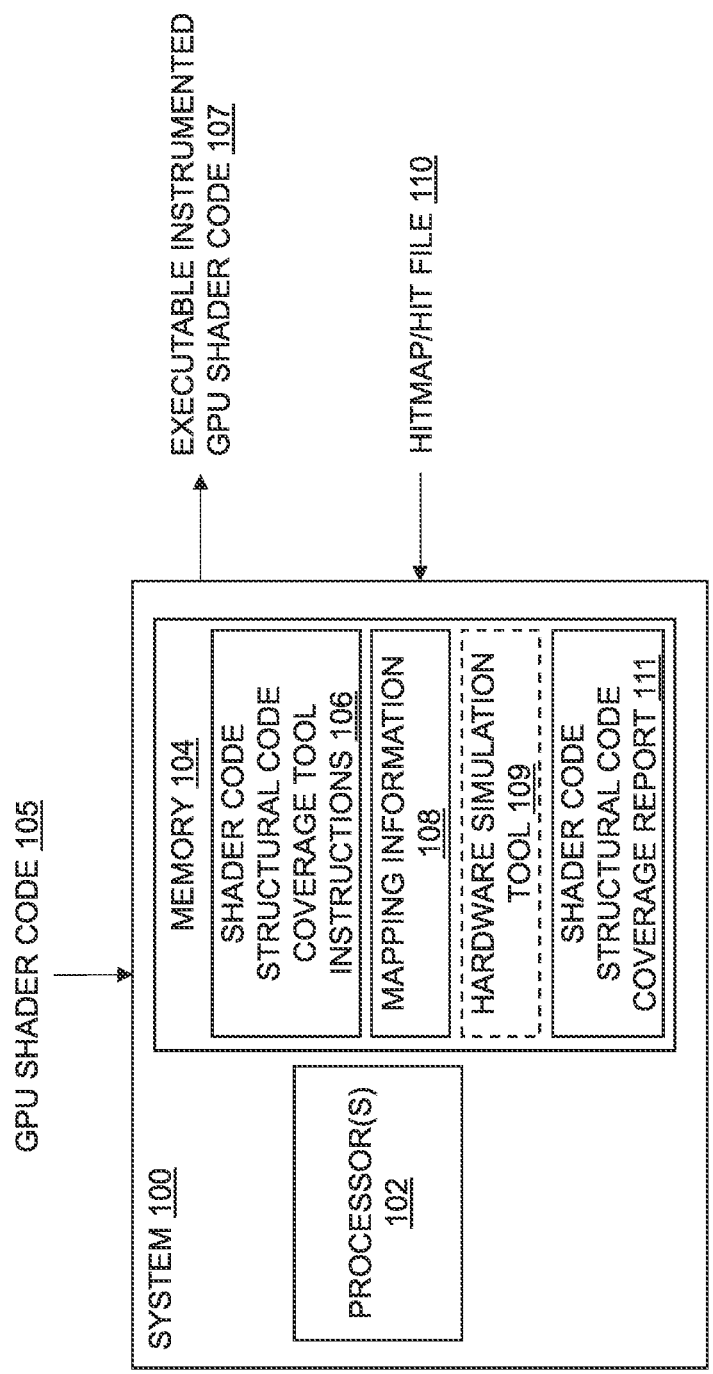
FIG. 1 is a block diagram of an example system.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which are shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Video games and other graphic applications require a lot more processing power than other programs and have to do a large number of pixel-by-pixel operations. Every single pixel on the screen needs to be computed, and this computation requires multiple parallel CPUs if the computations are run without a GPU. Code running on a GPU is used for rendering primitives specified by a graphics generation application, and the GPU is configured to translate a sequence of primitive drawing objects (lines, points, triangles) into rendered pixels in the framebuffer for display on a screen or display device. A GPU can also be used for high computations code as well.

Modern cockpits also require a lot of graphical-intensive functions to be executed, and GPUs are being utilized more frequently in addition to CPUs. Advanced graphics drivers (for example, Vulkan) used in next generation avionics use shader code. Shader code is a piece of code that is executed on the GPU, usually found on a graphics card, to manipulate an image before it is drawn to the screen. Shader code is written in a GPU specific programming language (for example, High-Level Shader Language (HLSL)) rather than a more conventional programming language. The object-rendering code executed on a GPU needs to be subjected to the requirements-based testing in a similar manner as discussed above, and structural code coverage data needs to be generated for the object-rendering code during the requirements-based testing as well.

Structural code coverage data for GPU shader code can be produced by manually executing the source code for the GPU and assuming parts of the shader code are covered when certain portions of the requirements-based test are passed. However, there are a number of problems with this approach. The approach is labor-intensive, prone to human error, increases costs, and increases cycle time for development. Also, it is likely that many certification entities will be unwilling to accept a manual analysis approach and will insist upon qualified tools being used that automatically generate the structural code coverage data for GPU shader code during requirements-based testing.

In some systems, the CPU and GPU of the system communicate bidirectionally, and the GPU can be used to store data in a shared location where it can be processed by the CPU. In other systems, the communication between the CPU and GPU of the system is unidirectional where the CPU sends data to be rendered by the GPU, but there is no communication from the GPU to the CPU. For either type of system, there are no currently available tools for instrumenting GPU shader code or automatically generating structural code coverage data for GPU shader code. Further, a GPU typically will not have sufficient memory to store structural code coverage data.

The techniques described herein enable automatic generation of structural code coverage data for GPU shader code from execution of requirements-based tests. The systems and methods add flags to the GPU shader code and create at least one graphic object on a display device for each line of GPU shader code to be executed during the requirements-based test. During execution of the requirements-based test, an attribute of the displayed graphic objects is changed based on different flags when an associated portion of the GPU shader code is executed. The systems and methods include generating a structural code coverage report for GPU shader code based on received hit files that include a status of the attribute of the displayed graphic objects and a stored correspondence between the GPU shader code and the displayed graphic objects.

FIG. 1 illustrates a block diagram of an example system 100 in which the techniques for generating structural code coverage reports for GPU shader code discussed herein can be implemented. The system 100 includes one or more processors 102 and at least one memory 104. In the example shown in FIG. 1, the memory 104 includes shader code structural code coverage tool instructions 106. The one or more processors 102 are configured to execute the shader code structural code coverage tool instructions 106 in order to generate a shader code structural code coverage report 111.

The system 100 is configured to receive GPU shader code 105 that is to be evaluated by executing the shader code structural code coverage tool instructions 106. In some examples, the GPU shader code 105 is loaded onto the system 100 by a user. In some examples, the GPU shader code 105 is provided by the user via an interface (for example, a web interface).

In some examples, the system 100 is configured to receive an indication from a user of the required level of structural code coverage for the structural code coverage report 111 for the GPU shader code. In some examples, the levels of structural code coverage correspond to various Design Assurance Levels (DALs). As discussed above, DAL A is the highest level and requires MC/DC to be shown, DAL B is the mid-level and requires decision coverage to be shown, and DAL C is the lowest level and requires statement coverage to be shown. In some examples, the one or more processors 102 are configured to receive an input from the user indicating the DAL level that is needed for the structural code coverage report. In some examples, a user selects the required level of structural code coverage (for example, a DAL level) from a dropdown menu or list. In other examples, a user can indicate the required level of structural code coverage by entering the DAL level in a prompt. It should be understood that other techniques for providing the required level of structural code coverage can also be used.

In other examples, multiple versions of the shader code structural code coverage tool instructions 106 are stored in the memory 104 of the system 100, and each respective version of the shader code structural code coverage tool instructions 106 is configured to generate a particular level of structural code coverage report. For example, a first version of the shader code structural code coverage tool instructions 106 is configured to generate a DAL A structural code coverage report and a second version of the shader code structural code coverage tool instructions 106 is configured to generate a DAL B code coverage report. In some examples, the user selects a particular version of the shader code structural code coverage tool instructions 106 to use that has the desired level. For example, the user would select a version of the structural code coverage tool directed to the required level of structural code coverage.

When executing the shader code structural code coverage tool instructions 106, the one or more processors 102 are configured to generate executable instrumented GPU shader code 107 from the GPU shader code 105 provided to the system 100. The executable instrumented GPU shader code 107 is generated in stages. In some examples, instrumented GPU shader code is generated first by adding one or more flags to the GPU shader code 105 and creating at least one graphic object to be displayed on a display device for each line of the GPU shader code 105. In some examples, multiple graphic objects are created for at least one line of the GPU shader code 105 when decision coverage or MC/DC is required for the structural code coverage report 111. In examples where the level of structural code coverage is selectable, the one or more processors are configured to add flags to the GPU shader code 105 and create or assign graphic objects to be displayed on the display device in a manner consistent with the selected level. For example, if DAL C is selected, then the one or more processors 102 are configured to add flags needed to produce a structural code coverage report 111 showing statement coverage information. The process for instrumenting the GPU shader code 105 is discussed further below with respect to FIGS. 2-3.

During instrumentation, mapping information 108 is also generated that indicates a correspondence between a line of GPU shader code 105 and a graphic object to be displayed on the display device. In some examples, the mapping information 108 indicates a correspondence between a statement or decision branch for each line of GPU shader code 105 and a graphic object to be displayed on the display device. In some examples, the extent of the mapping information 108 depends on the required level of structural code coverage. For example, if a DAL C level is required, then the mapping information 108 will indicate a correspondence between the statements of the GPU shader code 105 and the created graphic objects to be displayed on the display device.

From the instrumented GPU shader code, the one or more processors 102 are configured to generate executable instrumented GPU shader code 107 by compiling and linking the instrumented GPU shader code. In some examples, compiling and linking are performed in separate stages. In other examples, the compiling and linking are performed in a single stage.

In the example shown in FIG. 1, the system 100 is configured to output the executable instrumented GPU shader code 107. In some examples, the executable instrumented GPU shader code 107 is output to separate target hardware (for example, a separate system with a CPU and GPU) for execution with scripts of a requirements-based test. In other examples, the executable instrumented GPU shader code 107 is output to simulated hardware for execution with scripts of a requirements-based test. In such examples, the target hardware is simulated by the system 100 using a hardware simulation tool 109.

The executable instrumented GPU shader code 107, when executed by the target hardware or simulated target hardware during the requirements-based test, cause the display device of the target system or simulated target hardware to display the graphic objects for each line of the GPU shader code. In some examples, each graphic object displayed on the display device includes one or more attributes that are in a default state prior to execution of the scripts of the requirements-based test. The one or more attributes can include a color, a shape, a size, and/or a pattern. For example, each graphic object displayed on the display device can have a default color of red when initially displayed.

In response to a respective line of GPU shader code being executed during the requirements-based test, at least one attribute of the graphic object for the respective line of GPU is changed. For example, if a respective line of GPU shader code is executed during the requirements-based test, the color of the respective graphic object for that line of GPU shader code is changed from red to green on the display device of the target hardware or the simulated target hardware.

In some examples, the graphic objects are displayed on the display device prior to completing execution of all of the scripts of the requirements-based test. For example, the graphic objects can be initially displayed on the display device with one or more default attributes prior to execution of all of the scripts of the requirements-based test. In such examples, when a line of GPU shader code corresponding to the graphic object is executed during the requirements-based test, then at least one of the default attributes is changed for the graphic object displayed on the display device. In this way, the attribute change for the graphic object can be used to provide structural code coverage data for a particular line of GPU shader code.

After completing execution of the scripts of the requirements-based test, the image on the display device will include all of the graphic objects with either the default or changed attribute(s). In some examples, the target hardware or the simulated target hardware is configured to output one or more hit files 110 that include the status of the attributes of the graphic objects displayed on the display device. In some examples, the one or more hit files 110 output by target hardware or the simulated target hardware includes an image file showing pixels of the display device that include the graphic objects.

The system 100 is configured to receive the one or more hit files 110 and generate the shader code structural code coverage report 111 based on the one or more hit files 110 and the mapping information 108. In some examples, the one or more processors 102 are configured to extract structural code coverage data from the one or more hit files 110 and map the structural code coverage data to the GPU shader code using the mapping information 108 stored in memory 104.

In some examples, the one or more processors 102 are configured to extract structural code coverage data from the one or more hit files 110 by determining the status of the attribute for each graphic object in the one or more hit files.

The status of the attribute of a respective graphic object indicates whether or not the respective line of GPU shader code associated with that graphic object was executed during the requirements-based test. For example, the color green can indicate that the respective line of GPU shader code was executed during the requirements-based test (covered), the color yellow can indicate that the respective line of GPU shader code was partially executed during the requirements-based test (partially covered), and the color red can indicate that the respective line of GPU shader code was not executed during the requirements-based test (not covered). This process can also be referred to as extracting coverage hitmaps, where a hitmap includes structural code coverage data for one or more lines of GPU shader code.

As discussed above, the mapping information 108 includes a correspondence between a line of GPU shader code 105 and a graphic object to be displayed on the display device. The one or more processors 102 are configured to map the status of the attribute of each graphic object with the corresponding line of GPU shader code 105 and generate the shader code structural code coverage report 111.

The level of structural code coverage for the shader code structural code coverage report 111 will depend on the level selected by the user as discussed above. The format of the shader code structural code coverage report 111 can vary depending on requirements. For example, the shader code structural code coverage report 111 can be generated as an HTML or TXT file. However, in any format, the shader code structural code coverage report 111 will indicate whether a line of GPU shader code (or statements and decision branches) was executed or not during the requirements-based test execution.

Figure 2:
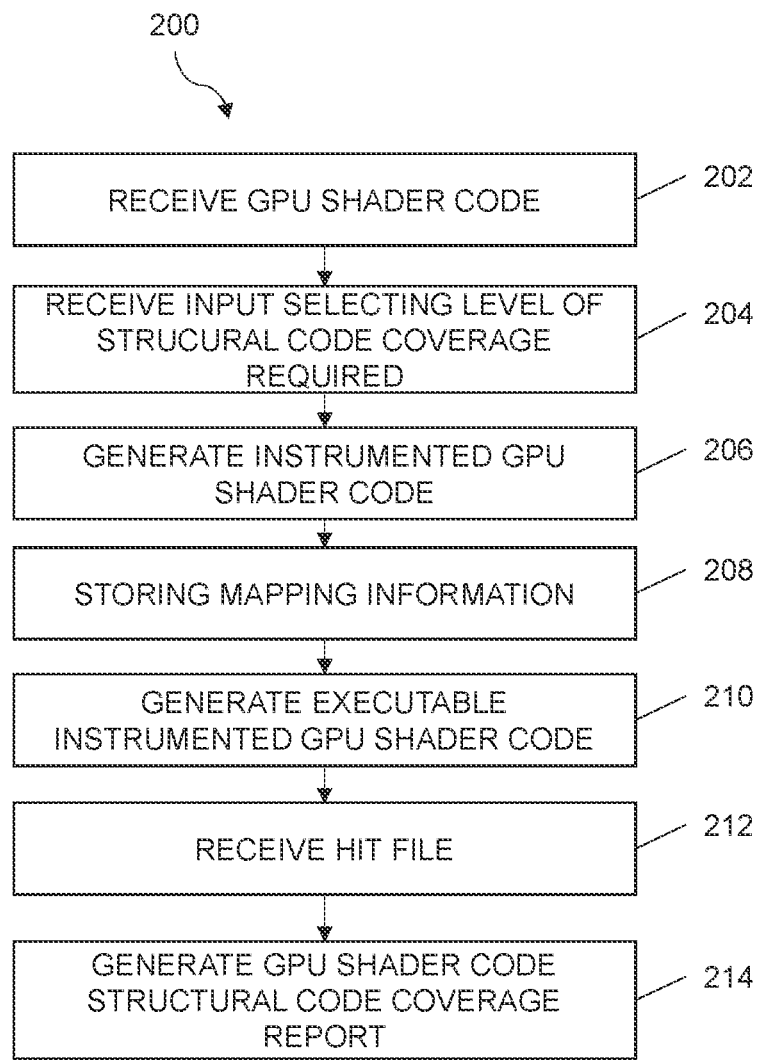
FIG. 2 illustrates a flow diagram of an example method of determining structural code coverage for graphics processing unit (GPU) shader code.

FIG. 2 illustrates a flow diagram of an example method 200 of determining structural code coverage data for GPU shader code. The common features discussed above with respect to the example system in FIG. 1 can include similar characteristics to those discussed with respect to method 200 and vice versa. In some examples, the blocks of the method 200 are performed by the one or more processors 102 of the system 100 when executing the shader code structural code coverage tool instructions 106.

The blocks of the flow diagram in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel in an event-driven manner).

The method 200 includes receiving GPU shader code (block 202). In some examples, the GPU shader code is provided to the system 100 by a user via one or more inputs. In some examples, the one or more inputs include a web interface or the like.

The method 200 further includes receiving an input selecting a level of structural code coverage required (block 204). In some examples, the input selecting the level of structural code coverage required is provided by a user. In some such examples, the user provides the input by selecting a particular level of structural code coverage from a dropdown menu, list, or the like. In other examples, the input selecting a level of structural code coverage required includes a selection of a particular version of the shader code structural code coverage tool that is specifically configured for each level of structural code coverage. In some examples, the levels of structural code coverage that can be selected include different Design Assurance Levels (DALs). For example, the dropdown menu or list can include the options DAL A, DAL B, and DAL C for selection. In some examples, the levels of structural code coverage that can be selected include statement coverage, decision coverage, and MC/DC. Other options for levels of structural code coverage can also be included.

The method 200 further includes generating instrumented GPU shader code (block 206). In some examples, generating instrumented GPU shader code includes adding flags to the GPU shader code for each line GPU shader code. The flags are pieces of code that are executed when a corresponding line of GPU shader code has been executed during a requirements-based test. In some examples, generating instrumented GPU shader code further includes creating at least one graphic object to be displayed on a display device for each line of GPU shader code. In some examples, multiple graphic objects are created for a particular line of GPU shader code for decision branches of the GPU shader code. In some examples, generating the instrumented GPU shader code is based on the selected level of structural code coverage discussed above with respect to block 204. For example, if DAL C (statement coverage) is selected, then the instrumented GPU shader code will add flags and create graphic objects in order to provide structural code coverage to satisfy statement coverage requirements. The process for generating instrumented GPU shader code is further discussed with respect to FIG. 3 below.

The method 200 further includes storing mapping information (block 208). In some examples, the mapping information includes correlations between the displayed graphic objects and the lines of GPU shader code. In some examples, the mapping information includes correlations between the displayed graphic objects and the statements and decision branches in the GPU shader code. In some examples, the mapping information is generated during the process of generating the instrumented GPU shader code (for example, as discussed with respect to block 206 and FIG. 3). The mapping information can be stored in memory of the system (for example, host computer) or elsewhere so long as the mapping information is accessible by the system when generating the structural code coverage report for the GPU shader code.

The method 200 further includes generating executable instrumented GPU shader code (block 210). In some examples, generating the executable instrumented GPU shader code includes compiling and linking the instrumented GPU shader code. The executable instrumented GPU shader code can be output to the target hardware or simulated target hardware for execution for the requirements-based test.

The method 200 further includes receiving a hit file (block 212). The hit file includes a status of attribute(s) of the graphic objects of the display device used to track execution of the GPU shader code during the requirements-based test. In some examples, the hit file is an image file showing the graphic objects displayed on the display device, which can be analyzed by the host computer to extract coverage hitmaps for each line of the GPU shader code.

The method 200 further includes generating a structural code coverage report for the GPU shader code (block 214). In some examples, the structural code coverage report for the GPU shader code is generated based on the extracted coverage hitmaps and the mapping information stored in memory. As discussed above, in some examples, each of the graphic objects corresponds to a line of the GPU shader code. In some examples, each of the graphic objects corresponds to a statement or decision branch from the GPU shader code. The attribute(s) of the graphic objects from the extracted hitmaps are used to determine whether the particular statement or decision branch was fully covered, partially covered, or not covered during the requirements-based test.

In some examples, the structural code coverage report is output in HTML or TXT format. In some examples, the structural code coverage report includes structural code coverage data for each line of GPU shader code to the level selected in block 204. In some examples, each statement and each decision branch are displayed in a color depending on whether it was fully covered, partially covered, or not covered. In other examples, the indication of coverage is provided in text rather than color. Other techniques could also be used to indicate whether a line, statement, or decision branch of GPU shader code was executed during the requirements-based test. In some examples, the structural code coverage report can include a percentage of structural code coverage for the required level of structural code coverage. For example, the structural code coverage report can include a percentage associated with statement coverage, decision coverage, or MC/DC.

Figure 3:
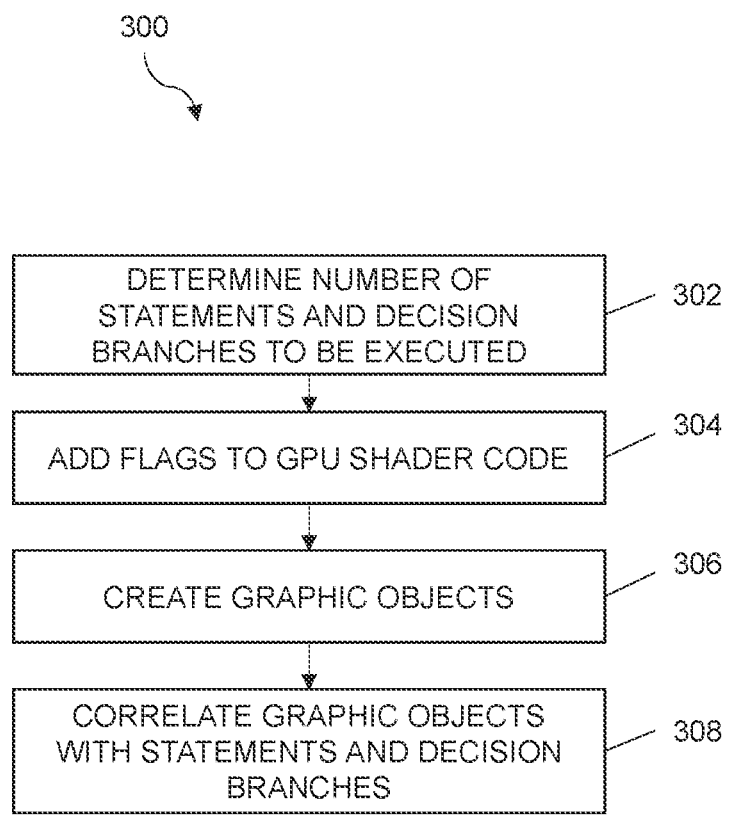
FIG. 3 illustrates a flow diagram of an example method of generating instrumented GPU shader code.

FIG. 3 illustrates a flow diagram of an example method 300 of generating instrumented GPU shader code. The common features discussed above with respect to the example system and method in FIGS. 1-2 can include similar characteristics to those discussed with respect to method 300 and vice versa. In some examples, the blocks of the method 300 are performed by a system 100 executing the shader code structural code coverage tool instructions 106.

The blocks of the flow diagram in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel in an event-driven manner).

The method 300 includes determining a number of statements and decision branches to be executed during the requirements-based test (block 302). In some examples, the number of statements and decision branches to be executed is determined based on the selected level of structural code coverage required (for example, as discussed for block 204).

The method 300 further includes adding flags to the GPU shader code (block 304). In some examples, adding flags to the GPU shader code includes adding a flag to the GPU shader code based on the determined number of statements and decision branches to be executed during the requirements-based test. In some examples, a respective flag is added to the GPU shader code for each respective statement and each respective decision branch to be executed during the requirements-based test. The flags are portions of instrumented GPU shader code that are executed when a respective statement or a respective decision branch in the GPU shader code is executed during the requirements-based test.

The method 300 further includes creating graphic objects to be displayed on a display device (block 306). In some examples, creating graphic objects is based on the determined number of statements and decision branches to be executed during the requirements-based test. In some examples, a respective graphic object is created for each respective statement and each respective decision branch to be executed during the requirements-based test. In some examples, the respective graphic objects are displayed using respective pixels of a display device. The graphic objects have particular attributes including, but not limited to, color, shape, size, and/or pattern.

In some examples, the method 300 further includes correlating the graphic objects with statements and decision branches in the GPU shader code (block 308). In some examples, the correlations between the graphic objects and the statements and the decision branches in the GPU shader code include pixel information as well (for example, when each respective graphic object is displayed using a respective pixel). The correlations can be stored in memory as mapping information as discussed above with respect to block 208.

Figure 4:
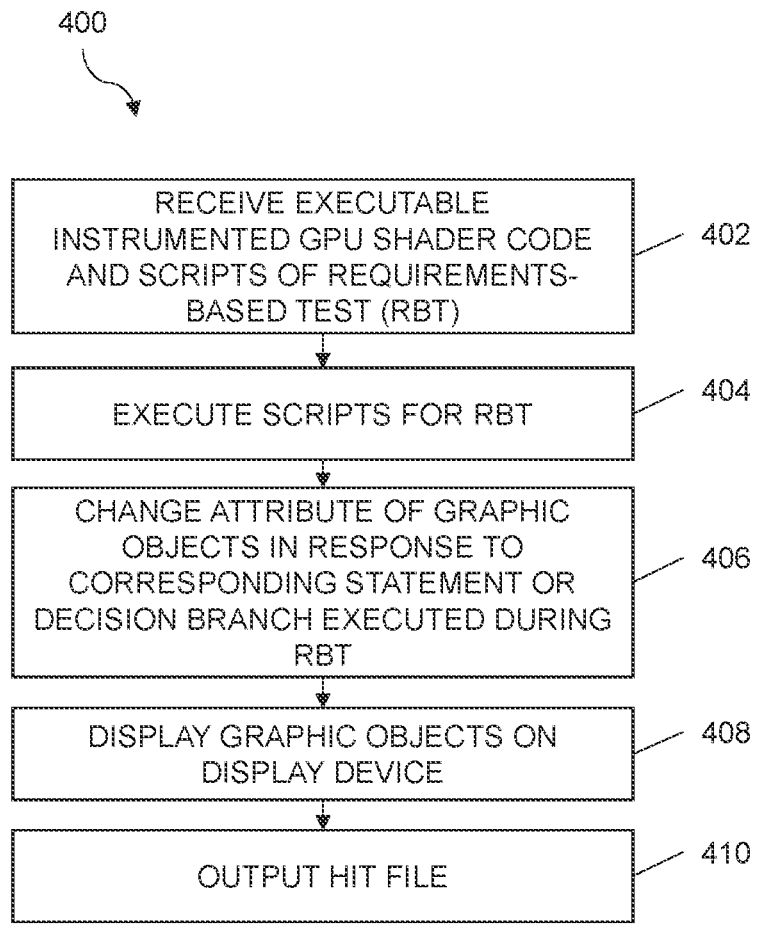
FIG. 4 illustrates a flow diagram of an example method of generating structural code coverage data for GPU shader code.

FIG. 4 illustrates a flow diagram of an example method 400 of generating structural code coverage data for GPU shader code. The common features discussed above with respect to the example system and methods in FIGS. 1-3 can include similar characteristics to those discussed with respect to method 400 and vice versa. In some examples, the blocks of the method 400 are performed by target hardware communicatively coupled to a host computer or simulated target hardware on the host computer.

The blocks of the flow diagram in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel in an event-driven manner).

The method 400 includes receiving executable instrumented GPU shader code and scripts of a requirements-based test (block 402). In some examples, the executable instrumented GPU shader code received from a host computer executing a shader code structural code coverage tool. In some examples, the scripts of the requirements-based test are also received from the host computer. In other examples, the scripts of the requirements-based test are received from a device separate from the host computer.

The method 400 further includes executing scripts of a requirements-based test (block 404). In some examples, executing the scripts of the requirements-based test is performed using a CPU and a GPU.

Figure 5A:
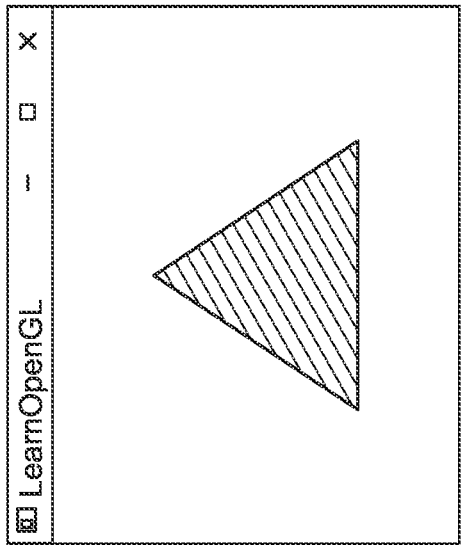
FIGS. 5A-5B illustrate example instrumented code and graphic objects indicating structural code coverage for GPU shader code.
Figure 5B:
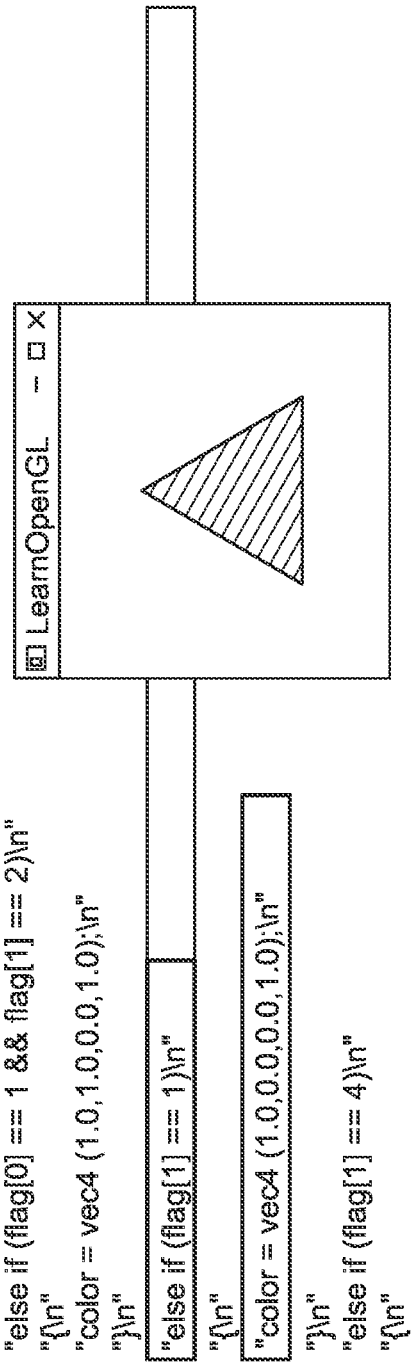

The method 400 further includes changing an attribute of the graphic objects in response to a corresponding statement or decision branch being executed during the requirements-based test (block 406). In some examples, the attribute of the graphic objects is changed from a default state to a modified state. FIGS. 5A-5B illustrates example instrumented code and graphic objects for indicating structural code coverage for GPU shader code with a pattern. In the example shown in FIG. 5A, the pattern of the graphic object associated with a statement or decision branch of the GPU shader code has been set to a first pattern, which indicates that the statement or decision branch of the GPU shader code has been executed during the requirements-based test. In the example shown in FIG. 5B, the pattern of the graphic object associated with a statement or decision branch of the GPU shader code has been set to (or remains) an alternative pattern, which indicates that the statement or decision branch of the GPU shader code has not been executed during the requirements-based test. Other attributes of the graphic object could also be used to provide the indication. For example, the color of the graphic object, the shape of the graphic object, the size of the graphic object, and/or the pattern of the graphic object can be changed from a default state to another state to indicate that a respective statement or decision branch of the GPU shader code has been executed.

The method 400 further includes displaying graphic objects on a display device for each statement and decision branch of GPU shader code (block 408). In some examples, each graphic object is displayed using a respective pixel of the display device. In some examples, the pixels that are used for displaying the graphic objects are otherwise unused on the display device during execution of the scripts of the requirements-based test.

The method 400 further includes outputting a hit file (block 410). In some examples, the hit file is output to the host computer that is executing the shader code structural code coverage tool. In some examples, the hit file includes a status of the attribute that is changed for the graphic objects in response to an associated statement or decision branch being executed during the requirements-based test. The hit file is output in response to completion of the execution of the scripts of the requirement-based test without storing the one or more hit files in a memory of the GPU. In some examples, the hit file is an image of the displayed graphic objects on the display device after completion of the requirements-based test.

Figure 6A:
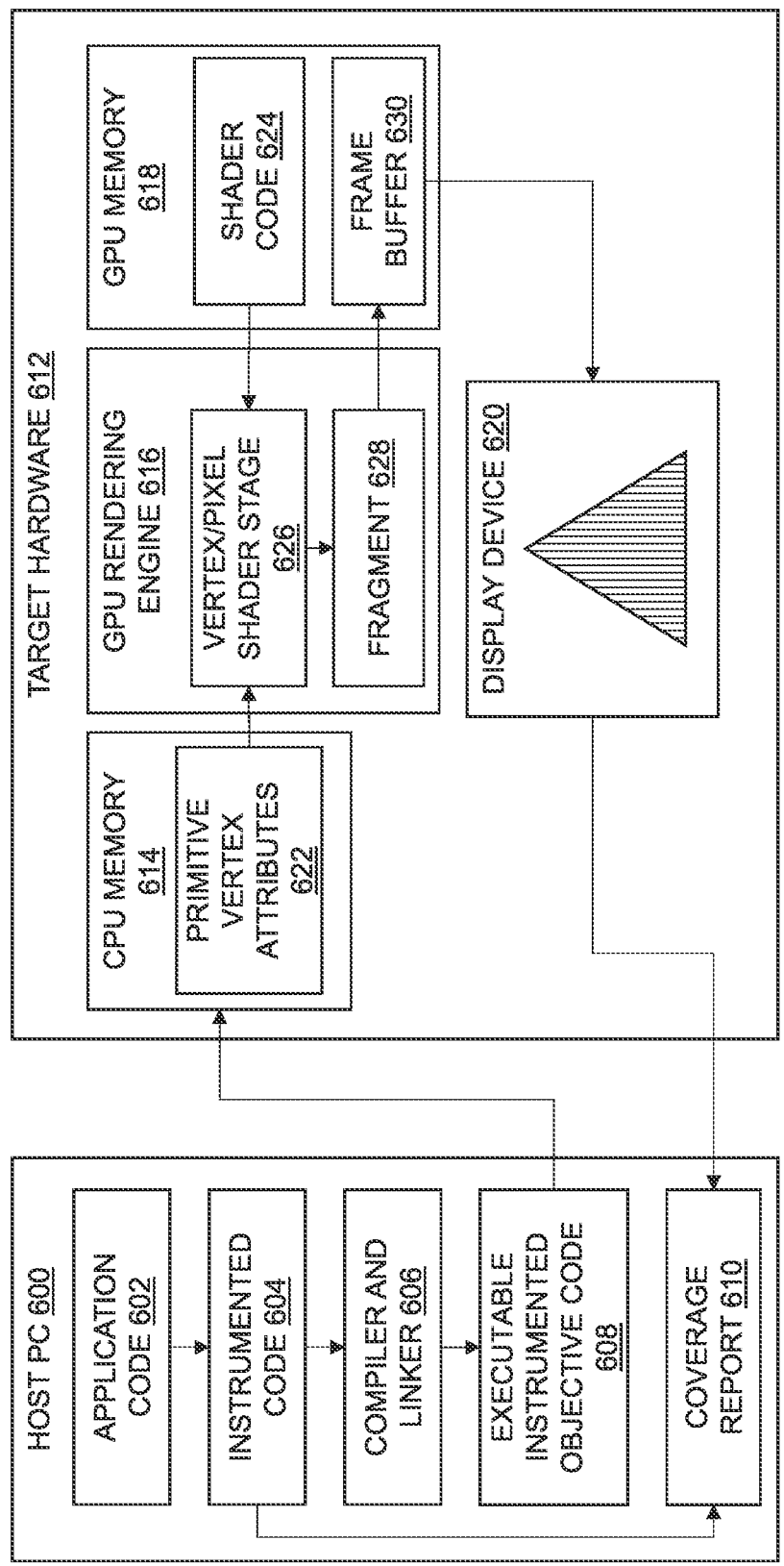
FIGS. 6A-6B illustrate an example target and simulation environments for conducting a requirements-based test and determining structural code coverage for GPU shader code.

FIG. 6A illustrates an example target environment for conducting a requirements-based test and determining structural code coverage for GPU shader code.

In the example shown in FIG. 6A, the host PC 600 (for example, system 100) is configured to execute the shader code structural code coverage tool instructions discussed above with respect to FIG. 1. In the example shown in FIG. 6A, the application code 602 is the GPU shader code that is used to render an image on the display device and is referred to as GPU shader code below. The host PC 600 is configured to generate instrumented GPU shader code 604 and instrumented executable objective code 608 (also referred to as "instrumented executable GPU shader code 608") as described above with respect to FIGS. 1-3.

In the example shown in FIG. 6A, the executable instrumented GPU shader code 608 is loaded onto the CPU memory 614 of the target hardware 612. The CPU of the target hardware 612 is configured to push the primitive vertex attributes 622 onto the GPU rendering engine 616 of the target hardware 612. The GPU rendering engine 616 of the target hardware 612 is configured to use shader code 624 stored in the GPU memory 618 to convert the coordinates into vertices and pixels using one or more vertex and pixel shader stages 626. The GPU rendering engine 616 of the target hardware 612 is further configured to fragment the output of the vertex and pixel shader stages 626 at a fragment stage 628 and push the output to the frame buffer 630, which goes to the display device 620 of the target hardware 612.

In the example shown in FIG. 6A, pixels on the display device 620 of the target hardware 612 are allocated for displaying the structural code coverage data for the shader code. In some examples, each respective pixel that is allocated on the display device 620 of the target hardware 612 corresponds to a statement or decision branch of the shader code. When the requirements-based test is executed by the target hardware 612, at least one attribute of a respective pixel is changed in response to a corresponding statement or decision branch of the shader code being executed. For example, the color of the pixel is changed from red to green when the corresponding statement or decision branch of the shader code is executed.

After execution of scripts of the requirements-based test, the target hardware 612 is configured to output one or more hitmaps back to the host PC 600. The one or more hitmaps include the status of the attribute of each respective pixel for each respective line of the instrumented shader code. In some examples, the one or more hitmaps include an image file. In such examples, the host PC 600 is configured to process the image to determine the status of each of the pixels.

In the example shown in FIG. 6A, the host PC 600 is configured to generate the structural code coverage report 610 for the shader code based on the status of the one or more attributes of each pixel and a mapping between the shader code and the pixels. In some examples, the GPU shader code is instrumented based on a level of code coverage required, and the host PC 600 is configured to generate a structural code coverage report 610 that includes a showing the level of code coverage required. For example, for a DAL C level of code coverage, the host PC 600 is configured to instrument the GPU shader code by adding flags for each statement in the GPU shader code and generate a structural code coverage report 610 that shows statement coverage.

Figure 6B:
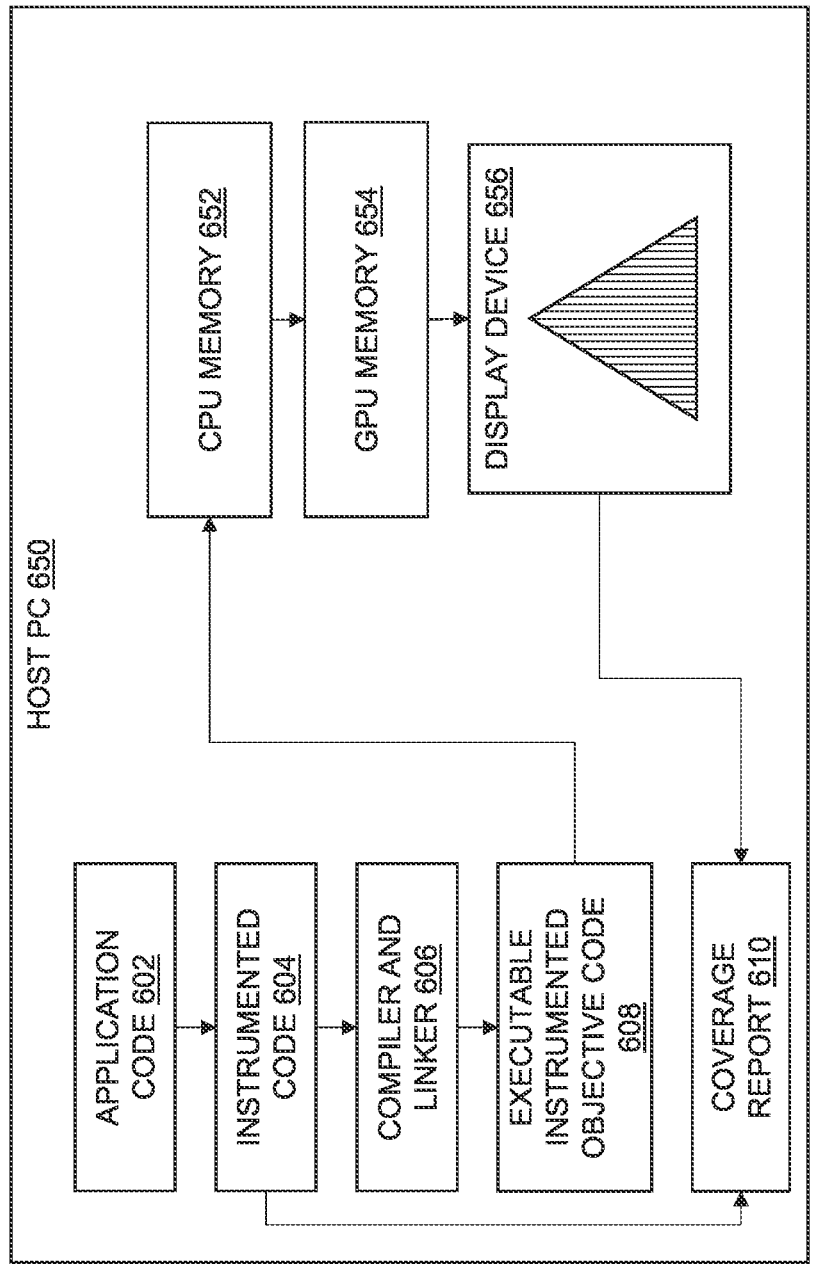

FIG. 6B illustrates an example simulation environment for conducting a requirements-based test and determining structural code coverage for GPU shader code. Rather than outputting the executable instrumented GPU shader code as discussed above with respect to FIG. 6A, the host PC 650 is configured to simulate the target hardware (CPU memory 652, GPU memory 654, and display device 656). The host PC 650 and the target hardware simulated on the host PC 650 are otherwise configured to operate in a manner similar to that described above with respect to FIG. 6A.

By using the techniques described herein, GPU shader code can be instrumented, and structural code coverage data can be automatically generated for GPU shader code. By displaying the structural code coverage data on a display device using graphic objects, the impact on GPU memory utilization is minimized using the techniques described herein. The systems and methods described herein greatly reduce the cost, cycle time, and likelihood of error by using an automatic tool rather than manual analysis. Moreover, the systems and methods described herein enable the generation of structural code coverage reports that comply with the requirements for various DAL levels using a single tool.

In various aspects, system elements, method steps, or examples described throughout this disclosure (such as the system, or components thereof, for example) may be implemented on one or more computer systems including a central processing unit (CPU), graphics processing unit (GPU), field programmable gate array (FPGA), application specific integrated circuit (ASIC) and/or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a method, comprising: adding a flag for each line of shader code to be executed by a graphics processing unit (GPU); creating at least one graphic object to be displayed on a display device for each line of shader code to be executed by the GPU; receiving one or more hit files that include a status of one or more attributes of displayed graphic objects on the display device after execution of a requirements-based test; and generating a structural code coverage report for the shader code based on the one or more hit files and a mapping between the shader code and the displayed graphic objects.

Example 2 includes the method of Example 1, wherein generating the structural code coverage report for the shader code is based on requirements for Design Assurance Level (DAL) A, DAL B, and/or DAL C.

Example 3 includes the method of any of Examples 1-2, wherein the at least one graphic object to be displayed on the display device for a first line of shader code includes a first graphic object and a second graphic object, wherein the first graphic object corresponds to a first decision branch for the first line of shader code, wherein the second graphic object corresponds to a second decision branch for the first line of shader code.

Example 4 includes the method of any of Examples 1-3, wherein the one or more attributes include a color, a shape, a size, and/or a pattern.

Example 5 includes the method of any of Examples 1-4, further comprising displaying each graphic object using a respective pixel of the display device.

Example 6 includes the method of any of Examples 1-5, wherein adding a flag for each line of shader code to be executed by the GPU includes adding a flag for each statement and decision branch of the shader code to be executed by the GPU.

Example 7 includes the method of any of Examples 1-6, further comprising changing an attribute of a respective displayed graphic object on the display device for a respective line of the shader code in response to the respective line of shader code being executed during the requirements-based test.

Example 8 includes the method of any of Examples 1-7, further comprising receiving an input from a user indicating a level of structural code coverage required for the structural code coverage report.

Example 9 includes the method of Example 8, wherein adding the flag for each line of shader code to be executed by the GPU and creating the at least one graphic object to be displayed on the display device for each line of shader code to be executed by the GPU are based on the level of structural code coverage required for the structural code coverage report indicated by the input from the user.

Example 10 includes a system, comprising: one or more processors; and a non-transitory, computer readable medium communicatively coupled to the one or more processors, wherein the non-transitory, computer readable medium stores one or more instructions which, when executed by the one or more processors, cause one or more processors to: add a flag for each line of shader code to be executed by a graphics processing unit (GPU); create at least one graphic object to be displayed on a display device for each line of shader code to be executed by the GPU; receive one or more hit files that include a status of one or more attributes of displayed graphic objects on the display device after execution of a requirements-based test; and generate a structural code coverage report for the shader code based the one or more hit files and a mapping between the shader code and the displayed graphic objects.

Example 11 includes the system of Example 10, wherein the system is configured to output executable instrumented shader code to a target system for execution; wherein the system is configured to receive the one or more hit files from the target system.

Example 12 includes the system of Example 10, wherein the one or more instructions, when executed by the one or more processors, further cause one or more processors to: simulate hardware of a target system; output executable instrumented shader code to the simulated hardware of the target system for execution; wherein the system is configured to receive the one or more hit files from the simulated hardware of the target system.

Example 13 includes the system of any of Examples 10-12, wherein the one or more instructions, when executed by the one or more processors, further cause one or more processors to add a flag for each statement and decision branch associated with each line of the shader code to be executed by the GPU; wherein the at least one graphic object to be displayed on a display device for each line of shader code to be executed by the GPU includes a respective graphic object for each statement and decision branch associated with each line of the shader code to be executed by the GPU.

Example 14 includes the system of any of Examples 10-13, wherein the system is configured to receive an input from a user indicating a level of structural code coverage required for the structural code coverage report.

Example 15 includes the system of any of Examples 10-14, wherein the one or more instructions, when executed by the one or more processors, cause the one or more processors to generate the structural code coverage report for the shader code based on requirements for Design Assurance Level (DAL) A, DAL B, and/or DAL C.

Example 16 includes a method, comprising: receiving instrumented shader code to be executed by a graphics processing unit (GPU) and scripts of a requirements-based test, wherein the instrumented shader code includes one or more flags for each line of the instrumented shader code; executing the scripts of the requirements-based test; displaying a respective graphic object for each line of the instrumented shader code on a display device; changing an attribute of a respective displayed graphic object for each respective line of the instrumented shader code in response to the respective line of the instrumented shader code being executed during the execution of the scripts of the requirements-based test; and outputting one or more hit files in response to completion of the execution of the scripts of the requirements-based test, wherein the one or more hit files include a status of the attribute of each respective displayed graphic object for each respective line of the instrumented shader code.

Example 17 includes the method of Example 16, wherein the attribute includes a color, a shape, a size, and/or a pattern.

Example 18 includes the method of any of Examples 16-17, wherein displaying the respective graphic object for each line of the instrumented shader code on the display device includes displaying the respective graphic object using a respective pixel of the display device.

Example 19 includes the method of any of Examples 16-18, wherein the method comprises outputting the one or more hit files in response to completion of the execution of the scripts of the requirements-based test without storing the one or more hit files in a memory of the GPU.

Example 20 includes the method of any of Examples 16-19, wherein changing the attribute of each respective displayed graphic object for each respective line of the instrumented shader code in response to the respective line of the instrumented shader code being executed during the execution of the scripts of the requirements-based test includes changing the attribute from a default state to a second state.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
   adding a flag for each line of shader code to be executed by a graphics processing unit (GPU);
   creating at least one graphic object to be displayed on a display device for each line of shader code to be executed by the GPU;
   receiving one or more hit files that include a status of one or more attributes of displayed graphic objects on the display device after execution of a requirements-based test; and
   generating a structural code coverage report for the shader code based on the one or more hit files and a mapping between the shader code and the displayed graphic objects;
   wherein adding a flag for each line of shader code to be executed by the GPU includes adding a flag for each statement and decision branch of the shader code to be executed by the GPU.

2. The method of claim 1, wherein generating the structural code coverage report for the shader code is based on requirements for Design Assurance Level (DAL) A, DAL B, and/or DAL C.

3. The method of claim 1, wherein the at least one graphic object to be displayed on the display device for a first line of shader code includes a first graphic object and a second graphic object, wherein the first graphic object corresponds to a first decision branch for the first line of shader code, wherein the second graphic object corresponds to a second decision branch for the first line of shader code.

4. The method of claim 1, wherein the one or more attributes include a color, a shape, a size, and/or a pattern.

5. The method of claim 1, further comprising displaying each graphic object using a respective pixel of the display device.

6. The method of claim 1, further comprising changing an attribute of a respective displayed graphic object on the display device for a respective line of the shader code in response to the respective line of shader code being executed during the requirements-based test.

7. The method of claim 1, further comprising receiving an input from a user indicating a level of structural code coverage required for the structural code coverage report.

8. The method of claim 7, wherein adding the flag for each line of shader code to be executed by the GPU and creating the at least one graphic object to be displayed on the display device for each line of shader code to be executed by the GPU are based on the level of structural code coverage required for the structural code coverage report indicated by the input from the user.

9. A system, comprising:
   one or more processors; and
   a non-transitory, computer readable medium communicatively coupled to the one or more processors, wherein the non-transitory, computer readable medium stores one or more instructions which, when executed by the one or more processors, cause one or more processors to:
   add a flag for each line of shader code to be executed by a graphics processing unit (GPU);
   create at least one graphic object to be displayed on a display device for each line of shader code to be executed by the GPU;
   receive one or more hit files that include a status of one or more attributes of displayed graphic objects on the display device after execution of a requirements-based test; and
   generate a structural code coverage report for the shader code based the one or more hit files and a mapping between the shader code and the displayed graphic objects;
   wherein adding the flag for each line of shader code to be executed by the GPU and creating at least one graphic object to be displayed on the display device for each line of shader code executed by the GPU are based on the level of structural code coverage required for the structural code coverage report indicated by the input from the user; and
   wherein the at least one graphic object has a uniquely modified attribute.

10. The system of claim 9, wherein the system is configured to output executable instrumented shader code to a target system for execution;
wherein the system is configured to receive the one or more hit files from the target system.

11. The system of claim 9, wherein the one or more instructions, when executed by the one or more processors, further cause one or more processors to:
simulate hardware of a target system;
output executable instrumented shader code to the simulated hardware of the target system for execution;
wherein the system is configured to receive the one or more hit files from the simulated hardware of the target system.

12. The system of claim 9, wherein the one or more instructions, when executed by the one or more processors, further cause one or more processors to add a flag for each statement and decision branch associated with each line of the shader code to be executed by the GPU;
wherein the at least one graphic object to be displayed on a display device for each line of shader code to be executed by the GPU includes a respective graphic object for each statement and decision branch associated with each line of the shader code to be executed by the GPU.

13. The system of claim 9, wherein the system is configured to receive an input from a user indicating the level of structural code coverage required for the structural code coverage report.

14. The system of claim 9, wherein the one or more instructions, when executed by the one or more processors, cause the one or more processors to generate the structural code coverage report for the shader code based on requirements for Design Assurance Level (DAL) A, DAL B, and/or DAL C.

15. A method, comprising:
receiving instrumented shader code to be executed by a graphics processing unit (GPU) and scripts of a requirements-based test, wherein the instrumented shader code includes one or more flags for each statement and decision branchline of the instrumented shader code to be executed by the GPU;
executing the scripts of the requirements-based test;
displaying a respective graphic object for each line of the instrumented shader code on a display device;
changing an attribute of a respective displayed graphic object for each respective line of the instrumented shader code in response to the respective line of the instrumented shader code being executed during the execution of the scripts of the requirements-based test; and
outputting one or more hit files in response to completion of the execution of the scripts of the requirements-based test, wherein the one or more hit files include a status of the attribute of each respective displayed graphic object for each respective line of the instrumented shader code.

16. The method of claim 15, wherein the attribute includes a color, a shape, a size, and/or a pattern.

17. The method of claim 15, wherein displaying the respective graphic object for each line of the instrumented shader code on the display device includes displaying the respective graphic object using a respective pixel of the display device.

18. The method of claim 15, wherein the method comprises outputting the one or more hit files in response to completion of the execution of the scripts of the requirement-based test without storing the one or more hit files in a memory of the GPU.

19. The method of claim 15, wherein changing the attribute of each respective displayed graphic object for each respective line of the instrumented shader code in response to the respective line of the instrumented shader code being executed during the execution of the scripts of the requirements-based test includes changing the attribute from a default state to a second state.

* * * * *